United States Patent [19]

Ogawa et al.

[11] Patent Number: 5,005,038

[45] Date of Patent: Apr. 2, 1991

[54] FOCAL LENGTH CHANGEABLE CAMERA

[75] Inventors: Yukio Ogawa, Kanagawa; Michio Hirohata; Takanori Kodaira, both of Tokyo; Makoto Miyawaki, Kanagawa, all of Japan

[73] Assignee: Canon Kabushiki Kaisha, Tokyo, Japan

[21] Appl. No.: 545,123

[22] Filed: Jun. 27, 1990

Related U.S. Application Data

[63] Continuation of Ser. No. 504,053, Apr. 2, 1990, abandoned, which is a continuation of Ser. No. 406,189, Sep. 12, 1989, abandoned, which is a continuation of Ser. No. 325,036, Mar. 14, 1989, abandoned, which is a continuation of Ser. No. 145,654, Jan. 13, 1988, abandoned, which is a continuation of Ser. No. 918,619, Oct. 10, 1986, abandoned, which is a continuation of Ser. No. 658,694, Oct. 9, 1984, abandoned.

[30] Foreign Application Priority Data

Oct. 11, 1983 [JP] Japan ............................ 58-188341

[51] Int. Cl.$^5$ .......................... G03B 5/00; G03B 13/32
[52] U.S. Cl. ................................ 354/400; 354/195.12
[58] Field of Search .................... 354/400, 402, 195.1, 354/195.12; 350/429, 430, 255; 355/56, 58

[56] References Cited

U.S. PATENT DOCUMENTS

| | | | |
|---|---|---|---|
| 2,397,668 | 4/1946 | Kesses | 355/58 |
| 3,656,422 | 4/1972 | Hess et al. | 95/45 |
| 3,682,072 | 8/1972 | Hess et al. | 95/45 |
| 3,701,309 | 10/1972 | Thiele et al. | 354/195.1 |
| 3,873,189 | 3/1975 | Whitaker et al. | 355/58 X |
| 4,214,829 | 7/1980 | Ohashi | 354/195.12 |
| 4,348,089 | 9/1982 | Shenk | 354/195.1 |
| 4,397,544 | 8/1983 | Yajima et al. | 355/58 |
| 4,493,534 | 1/1985 | Ando et al. | 350/429 |
| 4,525,050 | 6/1985 | Ohashi | 364/195.12 |
| 4,597,657 | 7/1986 | Wakabayashi | 354/195.12 |
| 4,643,554 | 2/1987 | Ogawa | 354/400 |

FOREIGN PATENT DOCUMENTS 58-72168 4/1983 Japan.

*Primary Examiner*—W. B. Perkey
*Attorney, Agent, or Firm*—Toren, McGeady & Associates

[57] ABSTRACT

The disclosed camera changes between two focal lengths by bringing or taking a built-in attachment lens into and out of axial alignment with a master lens. A single electric motor serves as the drive source both for changing the focal length and effecting automatic focusing. The attachment lens is brought into axial alignment with the master lens for telephoto operation and taken out of axial alignment with the master lens for standard operation.

79 Claims, 3 Drawing Sheets

FOCAL LENGTH CHANGEABLE CAMERA

This is a continuation of Ser. No. 07/504,053, filed Apr. 2, 1990, now abandoned; which in turn is a continuation of Ser. No. 07/406,189, filed Sept. 12, 1989, now abandoned which in turn is a continuation application of Ser. No. 07/325,036, filed Mar. 14, 1989, now abandoned; which in turn is a continuation application of Ser. No. 07/145,654, filed Jan. 13, 1988, now abandoned; which in turn is a continuation application of Ser. No. 06/918,619, filed Oct. 10, 1986, now abandoned ; and which in turn is a continuation application of Ser. No. 06/658,694, filed Oct. 9, 1984, now abandoned.

BACKGROUND OF THE INVENTION:

1. Field of the Invention:

This invention relates to cameras whose focal lengths are changeable by changing optical systems, and more particularly to such a camera in which the changing of its optical system is controlled by an electric motor.

2. Description of the Prior Art:

Cameras capable of changing between two or more focal lengths by changing the photographic optical systems are known. Such a so-called focal length changeable camera is disclosed, for example, in U.S. Pat. No. 3,388,650. However, in most of these cameras, changing of the optical system is carried out manually. Motor driven focal length changeable cameras are also known, as disclosed, for example, in Japanese Laid-Open patent application No. SHO 57-146231. However, in such motor driven cameras, focusing of an object to be photographed is carried out either manually or by using another drive source. Prior art variable focal length autofocus cameras have drawbacks in that the focal length of the optical system cannot be changed smoothly. Moreover, the structure of the changing over mechanism and the structure of the focusing mechanism are complicated.

SUMMARY OF THE INVENTION

An object of the present invention is to eliminate the above-described drawbacks and to provide a focal length changeable camera in which the changing of the focal length and the focusing are selectively operated by one and the same motor.

Other objects of the present invention will become apparent from the following description of an embodiment thereof.

DESCRIPTION OF THE PREFERRED EMBODIMENTS

The present invention will be described in connection with an embodiment thereof by reference to the drawings.

Figure 1:
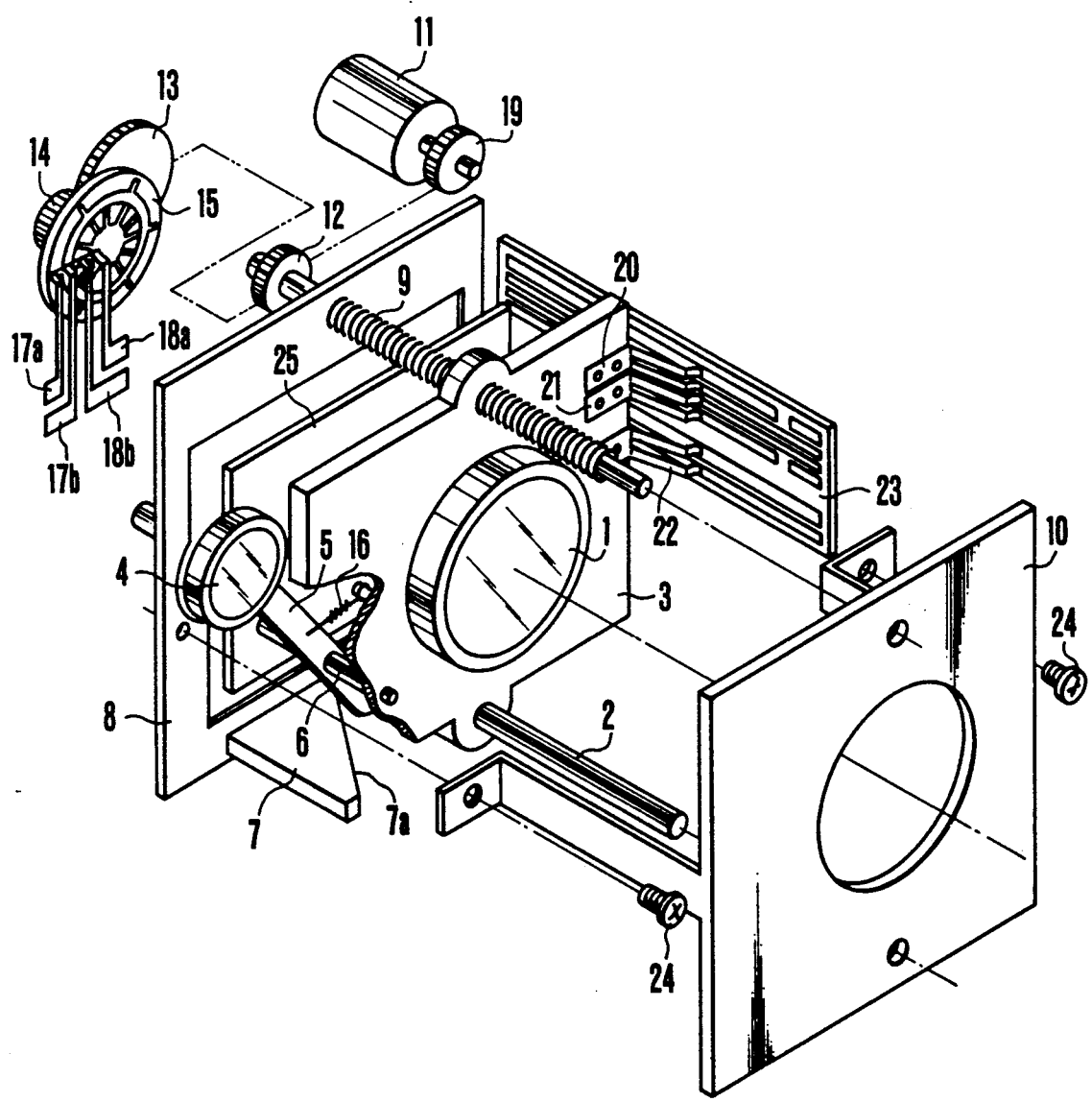
FIG. 1 is a production view of an embodiment of the focal length changeable camera according to the present invention.

FIG. 1 shows the internal mechanisms of a focal length changeable camera where a master lens 1 is held on a carrier plate 3. A support rod 2 is fixedly mounted to the carrier 3 and both of its ends are movably fitted in respective holes of front and rear plates 10 and 8, whereby the support rod 2 longitudinally moves between the front and rear plates 10 and 8. A drive rod 9 has its two ends supported on the front and rear plates 10 and 8 in respective fitted holes and is rotatable therebetween. The drive rod 9 is provided with a screw-threaded portion meshing with a screw-threaded portion of the carrier 3. At the rearmost end of the drive rod 9 is fixedly mounted a gear 12 drivingly connected through a gear train (not shown) to a pinion 19 on the output shaft of an electric motor 11. The gear 12 is also drivingly connected through a transmission (not shown) to a speed reduction gear 13 which meshes with a gear 14. A pulse disc 15 having patterns depicted thereon is fixedly mounted on the common shaft of the gear 14. Four slides 17a, 17b, 18a and 18b are in contact on the pulse disc 15 so that as the pulse disc rotates, two sets of pulses can be counted, depending on the respective patterns.

An auxiliary lens 4 is carried on a holder 5 which is fixedly mounted to a pivot shaft 6. One end of the shaft 6 is movably fitted in a hole of the master lens carrier plate 3 and the other end abuts a pressor plate 25. Therefore, the auxiliary lens 4 slidingly moves along with the master lens carrier 3 and is simultaneously rotatable about the axis of the shaft 6. A spring 16 urges the holder 5 in a clockwise direction. The rear plate 8 is provided with a cam lobe 7. The free end of the lever of the holder 5 abuts the tapered portion of the cam lobe 7 so that as the carrier 3 moves rearward, the lever turns in a counterclockwise direction against the spring 16, whereby the auxiliary lens 4 is retracted from axial alignment with the master lens 1. Three sliders 20, 21 and 22 are fixedly mounted to the master lens carrier 3 and arranged to move on patterns on a side wall 23. The front plate 10 is fixedly secured to the rear plate 8 by screw fasteners 24, and the rear plate 8 is fixedly secured to a framework of the camera.

Figure 2:
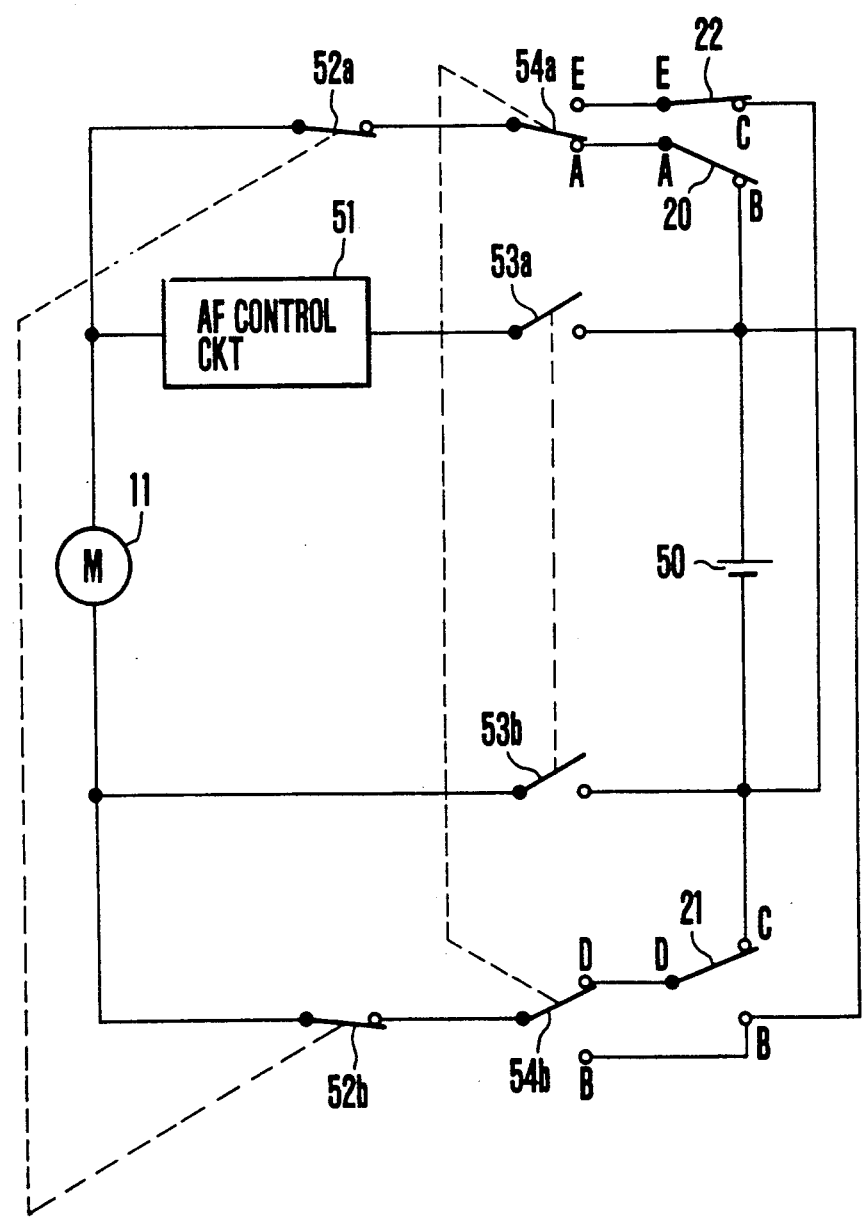
FIG. 2 is an electrical circuit diagram of a control circuit for the motor of FIG. 1.
Figure 3:
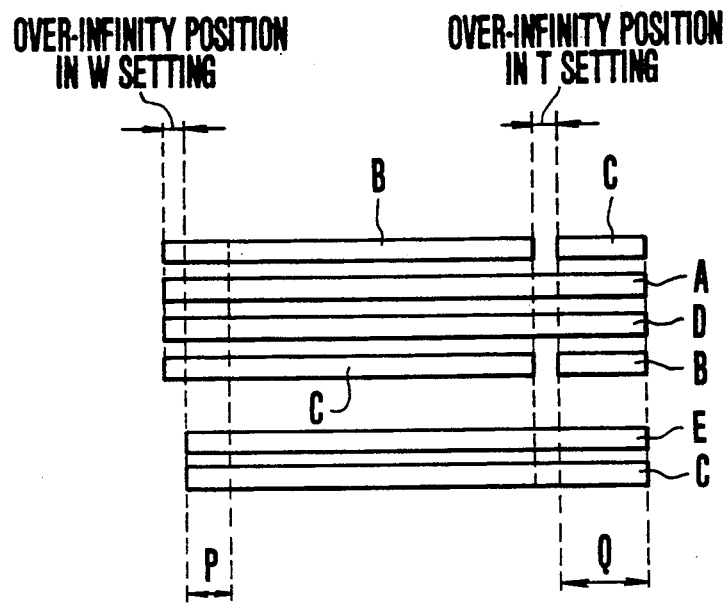
FIG. 3 is a plan view illustrating the details of the pattern on the focal length setting plate of FIG. 1.

Turning here to FIG. 2 shows a control circuit for the motor 11 of FIG. 1, where the same parts as those shown in FIG. 1 are denoted by the same reference characters. Element 50 is an electrical power source. Elements 52a and 52b are normally closed switches arranged to open when a release actuation is operated to a first stroke and operatively connected to each other; 53a and 53b are switches arranged to turn on when a second stroke is operated, and are also operatively connected to each other; 54a and 54b are T-W selector switches operatively connected to each other and arranged so that when moved to their positions A and D respectively, a telephoto (T) setting results, and when moved to their positions E and B respectively, a wide (W) setting results. Switches 20, 21 and 22 have movable contacts identified as sliders in FIG. 1, while the fixed contacts A, B, C, D and E are identified as patterns shown in FIG. 3. The term "over-infinity" positions for the W and T settings used in FIG. 3 means that the photographic optical system is initially positioned beyond that terminal end of focusing movement which represents an infinite object distance. In other words, when the master lens carrier plate 3 is ready to shoot with the standard lens or the telephoto lens, it always takes its place in the respective one of those positions.

Figure 4:
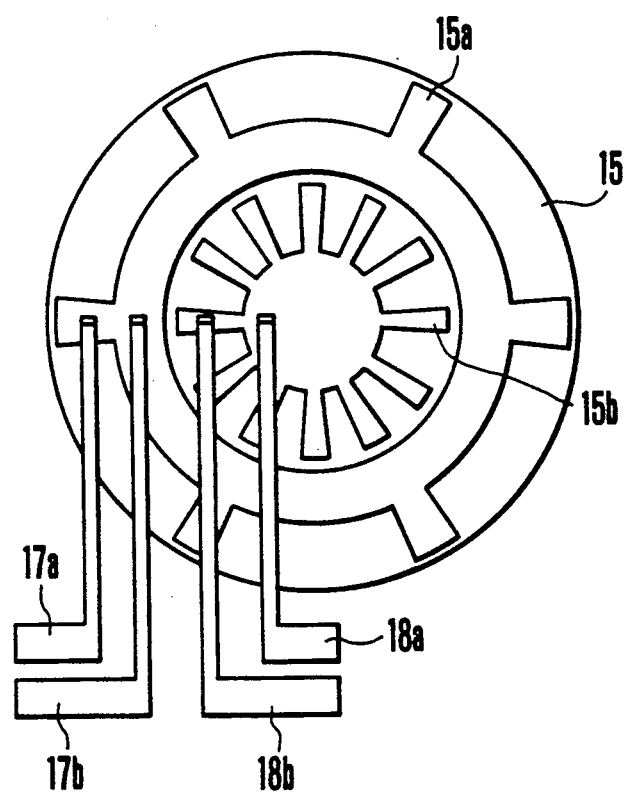
FIG. 4 is a plan view illustrating the details of construction of the pulse forming plate of FIG. 1.

Upon actuation of a camera release, the master lens carrier starts to move from the over-infinity position and as focusing goes on, it travels a stroke P or Q depending on the standard or wide setting or the telephoto setting respectively. The length of the stroke Q for the T setting shown as is equal to just two times that of the stroke P for the W setting. This is because, in this embodiment, the required amount of movement of the optical system for an equivalent focusing range to that when in the W setting is assumed to be just two times as large. That is, for W photography, the master lens 1 alone constitutes the photographic optical system, but for T photography, both the master lens and the auxiliary lens 4 are used to constitute the photographic optical system of a longer focal length than in the W photography. In this embodiment, the change of the total focusing movement resulting from the change of the focal length is assumed to be by a factor of 2. For this reason, the pulse disc for detecting how long the photographic lens has moved when focusing is provided with two patterns for the W and T settings as shown in detail in FIG. 4, The pattern 15b is used when focusing in the W setting, and the pattern 15a is used when focusing in the T setting. In correspondence with the above-described ratio, the pattern 15b has 12 spokes and the pattern 15a has 6 spokes.

Therefore, during focusing in the W setting, as the photographic lens moves from one terminal end for infinity to the opposite terminal end for the minimum object distance, the pulse disc 15 rotates just one revolution, whereby 12 pulses are counted. In the T setting, on the other hand, for the equivalent focusing range, the pulse disc 15 rotates two revolutions, permitting 12 pulses to be counted.

The operation of the camera of such construction will now be described: Let us now call photography with the master lens 1 alone standard photography, and photography with a combined optical system of the master lens 1 and the auxiliary lens 4 in axial alignment with each other telephoto photography. Standard photography is first described below. When the T-W selector switches 54a and 54b are set in the standard photography positions E and B respectively, the motor 11 is connected to the electrical power source 50. At this time, a voltage of reverse direction is applied to the motor 11. Therefore, the motor 11 rotates in a reverse direction, driving the gear 12 to rotate in the reverse direction. Thus, the drive worm gear 9 starts to rotate in the reverse direction. Accordingly, the master lens carrier 3 is moved rearward as guided by the support rod 2. When the slider 22 then overruns the electrically conducting stripes, the switch 22 turns off, whereby the supply of current to the motor 11 is cut off. Thus, the master lens 1 is set in the initial position for standard photography. At this time, the auxiliary lens 4 is fully retracted from the path of light from the master lens 1 by the cam lobe 7 on the rear plate 8 engaging the free end of the lever of the holder 5.

When a camera release is then actuated, its first stroke results in turning off the switches 52a and 52b, whereby an AF mechanism (not shown) is rendered operative. After the distance from the camera to the object has been measured, a subsequent or second stroke is operated, the switches 53a and 53b are turned on, thereby an AF control circuit 51 is rendered operative.

At the same time when this AF control circuit 51 starts to operate, the motor 11 is supplied again with current of forward direction. The drive worm gear 9 thus rotates in a forward direction, moving forward the master lens carrier 3 which is guided by the support rod 2. As the motor 11 rotates, the pulse disc 15 rotates. When the number of pulses counted through the sliders 18a and 18b has reached a corresponding value to the measured object distance, the current supply to the motor 11 is cut off.

AF control circuit 51 stores the object distance information which has been obtained in the first stroke of the camera release in the form of a corresponding number of pulses and compares this pulse number with the number of pulses produced from the pulse disc 15. Upon coincidence a deactuating signal for stopping the current supply to the motor 11 is produced.

When the motor 11 stops, the master lens 1 is sharply focused on the object. After the termination of this focusing operation, the shutter (not shown) is opened and closed to make an exposure. When the release operation is released, the switches 53a and 53b are returned to OFF positions and the switches 52a and 52b to ON positions, whereby the motor 11 is supplied with current of reverse direction. Therefore, the master lens 1 moves backward. When it reaches the initial position, the switch 22 is turned off and the current supply to the motor 11 is cut off. Thus, the master lens 1 is reset at a point beyond the infinite limit of the focusing range for the W setting.

Explanation will now be given for telephoto photography. When the T-W selector switches 54a and 54b are set in their positions A and D, the motor 11 is connected to the electrical power source 50. In this case, the voltage applied to the motor 11 is of forward direction. Thereby, the motor 11 rotates in the forward direction, driving the worm gear 9 to rotate in the forward direction. Thus, the master lens carrier 3 moves forward guided by the support rod 2. When the sliders 20 and 21 on the carrier 3 come across their respective electrically non-conducting patches, the current supply to the motor 11 is cut off. Thus the master lens 1 is set in another initial position for the telephoto photography. During the movement of the carrier 3 to this or second initial position from the first position for the standard photography, the auxiliary lens 4 is brought into axial alignment with the master lens 1 as the lever of the holder 5 moves away from the cam lobe 7.

When a camera release is then actuated, the switches 52a and 52b turn off in the first stroke of the release, and the AF mechanism operates to measure the object distance. After that, the switches 53a and 53b are turn on in the second stroke of the release, whereby the AF control circuit 51 is rendered operative. At the same time, the motor 11 starts to rotate in the forward direction, driving the master lens 1 and the auxiliary lens 4 as a unit to move axially forward, while the sliders 17a and 17b scan the pattern 15a on the pulse disc 15. When a number of pulses corresponding to the measured object distance has been counted, the AF control circuit 51 produces an OFF signal, and the current supply to the motor 11 is cut off. Thus, the combined optical system focuses on to the given object. After the exposure has been completed, when the photographer removes his finger from depressing the release button, the switches 53a and 53b return to their OFF position and the switches 52a and 52b to their ON positions, whereby the motor 11 is supplied with current of reversed direction. Therefore, the photographic lens moves backward until the switches 20 and 21 move away from their positions B and C. Thus, the motor 11 stops and the photographic lens is reset in the initial position for telephoto photography.

As has been described above, the present invention provides a motor driven focal length changeable autofocus camera in which only one motor suffices not only for changing over between the two focal lengths of the photographic optical system but also for performing automatic focusing after the photographic optical system is automatically set in the initial position, This provides the advantages that the manageability is remarkably improved, that the operating mechanism is constructed in a simple form, that the bulk and size of the camera is minimized, further, and that the production cost is reduced because there is no need to employ two motors for the focal length changing and focusing purposes, respectively.

What is claimed is:

1. A driving device for varying a focal length of photographic optical means of a camera, comprising:
   (A) movable optical means for varying the focal length of the photographic optical means and for focusing the photographic optical means, said movable optical means being movable between a first position and a second position and arranged for performing the variation of the focal length and the focusing while moving between the first position and the second position;
   (B) single electric driving means for driving said movable optical means; and
   (C) control means for controlling said electric driving means, said control means including switch means for actuating said electric driving means so as to restore said movable optical means to a predetermined position after photography is performed.

2. A device according to claim 1, wherein said switch means is arranged to operate in response to a release operation.

3. A device according to claim 1, wherein said control means includes a first circuit for actuating said electric driving means so as to vary the focal length and a second circuit for actuating the electric driving means so as to perform the focusing, and said switch means is arranged to forcedly close the first circuit.

4. A device according to claim 1, wherein said optical means includes optical means for moving into and out of the optical path.

5. A driving device for varying a focal length of a photographic optical means of a camera, comprising:
   (A) movable optical means for varying the focal length of the photographic optical means and for focusing the photographic optical means, said movable optical means being movable between a first position and a second position and arranged for performing the variation of the focal length and the focusing while moving between the first position and the second position;
   (B) single electric driving means for driving said movable optical means; and
   (C) control means for controlling said electric driving means, said control means including:
      (a) a first circuit for actuating the electric driving means to vary the focal length;
      (b) a second circuit for actuating the electric driving means to perform the focusing; and
      (c) switch means for preventing the first circuit and the second circuit from closing simultaneously.

6. A device according to claim 5, wherein said optical means includes optical means for moving into and out of the optical path.

7. A driving device for varying a focal length of photographic optical means of a camera, comprising:
   (A) movable optical means for varying the focal length of the photographic optical means and for focusing the photographic optical means, said movable optical means being movable between a first position and a second position and arranged for performing the variation of the focal length and the focusing while moving between the first position and the second position;
   (B) single electric driving means for driving said movable optical means; and
   (C) a holding member for holding the movable optical means and having a threaded hole;
   (D) guide means for sliding said holding member linearly and moving said movable optical means between the first position and the second position; and
   (E) a threaded bar engageable with the threaded hole of the holding member, said threaded bar being rotatable by the driving force of said electric driving means to move the holding member along the guide means.

8. A device according to claim 7, wherein said optical means includes optical means for moving into and out of the optical path.

9. A driving device for varying a focal length and for performing a focal adjustment of optical means, comprising:
   (A) operation means for varying the focal length and performing the focal adjustment by moving the optical means between a first position and a second position;
   (B) driving means for driving said operation means; and
   (C) control means for controlling said drive means so as to return said optical means to a predetermined position after a photographing.

10. A device according to claim 9, wherein said operation means includes guide means having a screw portion on which said optical means moves by rotation of the screw portion.

11. A device according to claim 10, wherein said guide means includes a guide bar having said screw portion.

12. A device according to claim 10, wherein said screw portion of said guide means is provided with a zone for varying the focal length and a zone for the focal adjustment.

13. A device according to claim 9, wherein said operation means has a zone for varying the focal length and a zone for the focal adjustment.

14. A device according to claim 9, wherein said drive means includes a single electrical driving means.

15. A device according to claim 9, wherein said optical means includes optical means for moving into and out of the optical path.

16. A driving device for varying a focal length of photographic optical means of a camera, comprising:
   (A) operation means for varying the focal length of the photographic optical means and for focusing the photographic optical means, said operation means having a first zone for focusing the photographic optical means with respect to a first focal length, a second zone for changing the photographic optical means form the first focal length to a second focal length, and a third zone for focusing the photographic optical means with respect to the second focal length;

(B) a single drive means for driving said operation means; and (C) control means for controlling said electric drive means, said control means including judging means for judging an operation state of the photographic optical means.

17. A device according to claim 16, wherein said control means includes return means for returning said photographic optical means to a predetermined position after a photographing.

18. A device according to claim 16, wherein said optical means includes optical means for moving into and out of the optical path.

19. A camera, comprising:

(A) movable optical means for varying a focal length of photographic optical means and for focusing the photographic optical means, said movable optical means being movable between a first position and a second position and arranged for performing the variation of the focal length and the focusing while moving between the first position and the second position;

(B) single electric driving means for driving said movable optical means; and (C) control means for controlling said electric driving means, said control means including switch means for actuating said electric driving means so as to restore said movable optical means to a predetermined position after photography is performed.

20. A camera according to claim 19, wherein said switch means is arranged to operate in response to release operation.

21. A camera according to claim 19, wherein said control means includes a first circuit for actuating said electric driving means so as to vary the focal length and a second circuit for actuating the electric driving means so as to perform the focusing, and said switch means is arranged to forcedly close the first circuit.

22. A camera according to claim 19, wherein said optical means includes optical means for moving into and out of the optical path.

23. A camera, comprising:

(A) movable optical means for varying a focal length of photographic optical means and for focusing the photographic optical means, said movable optical means being movable between a first position and a second position and arranged for performing the variation of the focal length and the focusing while moving between the first position and the second position;

(B) single electric driving means for driving said movable optical means; and (C) control means for controlling said electric driving means, said control means including:

(a) a first circuit for actuating the electric driving means to vary the focal length;

(b) a second circuit for actuating the electric driving means to perform the focusing; and (c) switching means for preventing the first circuit and the second circuit from closing simultaneously.

24. A camera according to claim 23, wherein said optical means includes optical means for moving into and out of the optical path.

25. A camera, comprising:

(A) movable optical means for varying a focal length of photographic optical means and for focusing the photographic optical means, said movable optical means being movable between a first position and a second position and arranged for performing the variation of the focal length and the focusing while moving between the first position and the second position;

(B) single electric driving means for driving said movable optical means;

(C) a holding member for holding the movable optical means and having a threaded hole;

(D) guide means for sliding said holding member linearly and moving said movable optical means between the first position and the second position; and (E) a threaded bar engageable with the threaded hole of the holding member, said threaded bar being rotatable by the driving force of said electric driving means to move the holding member along the guide means.

26. A camera according to claim 25, wherein said optical means includes optical means for moving into and out of the optical path.

27. A camera, comprising:

(A) operation means for varying a focal length and performing a focal adjustment by moving optical means between a first position and a second position;

(B) driving means for driving said operation means; and (C) control means for controlling said drive means so as to return said optical means to a predetermined position after a photographing.

28. A camera according to claim 27, wherein said operation means includes guide means having a screw portion on which said optical means moves by rotation of the screw portion.

29. A camera according to claim 28, wherein said guide means includes a guide bar having said screw portion.

30. A camera according to claim 28, wherein said screw portion of said guide means is provided with a zone for varying the focal length and a zone for the focal adjustment.

31. A camera according to claim 27, wherein said operation means has a zone for varying the focal length and a zone for the focal adjustment.

32. A camera according to claim 27, wherein said drive means includes a single electrical driving means.

33. A camera according to claim 27, wherein said optical means includes optical means for moving into and out of the optical path.

34. A camera, comprising:

(A) operation means for varying a focal length of photographic optical means and for focusing the photographic optical means, said operation means having a first zone for focusing the photographic optical means with respect to a first focal length, a second zone for changing the photographic optical means from the first focal length to a second focal length, and a third zone for focusing the photographic optical means with respect to the second focal length;

(B) a single drive means for driving said operation means; and (C) control means or controlling said drive means, said control means including judging means for judging an operation state of the photographic optical means.

35. A camera according to claim 34, wherein said control means includes return means for returning said photographic optical system to a predetermined position after a photographing.

36. A camera according to claim 34, wherein said optical means includes optical means for moving into and out of the optical path.

37. A driving device for an optical system, comprising:
(A) magnificaiton varying signal output means for outputting a magnification varying signal;
(B) focal adjusting signal output means for outputting a focal adjusting signal;
(C) holding means for holding optical means and having a threaded portion;
(D) guide means for guiding said holding means;
(E) moving means having a threaded portion engageable with the threaded portion of said holding means, for moving said holding means in accordance with guidance of said guide means by rotation of the threaded portion thereof; and
(F) driving means for driving said moving means in response to the outputs of the magnification varying signal output means and said focal adjusting signal output means.

38. A device according to claim 37, wherein the threaded portion of said holding means includes a threaded hole.

39. A device according to claim 38, wherein the threaded portion of said moving means includes a threaded bar.

40. A device according to claim 37, wherein the threaded portion of said moving means includes a threaded bar.

41. A device according to claim 37, wherein said guide means includes means for sliding said holding means.

42. A device according to claim 37, wherein said guide means includes a guide bar.

43. A device according to claim 37, wherein said drive means includes a motor.

44. A device according to claim 37, wherein said drive means includes electrical drive means.

45. A device according to claim 37, and further comprising judging means for judging the movement state of said holding means moving in accordance with the guide of said guide means.

46. A device according to claim 45, wherein said judging means includes pulse generating means for generating a signal for movement of said holding means.

47. A device according to claim 45, wherein said judging means includes pulse generating means for judging an operation amount of said moving means.

48. A device according to claim 37, and further comprising judging means for judging whether said optical means has moved to a position corresponding to the outputs of said magnification varying signal output means and said focal adjusting signal output means.

49. A device according to claim 48, wherein said judging means includes means for stopping said drive means with judgment that said optical means has moved to the position corresponding to the outputs of said magnification varying signal output means and said focal adjustment signal output means.

50. A device according to claim 48, wherein said judging means includes means for stopping said holding means with judgment that said optical means has moved to the position corresponding to the outputs of said magnification varying signal output means and said focal adjustment signal output means.

51. A device according to claim 45, and further comprising means for causing said holding means to automatically return to a predetermined position after photography in response to the judging means.

52. A device according to claim 37, and further comprising means for causing said holding means to automatically return to a predetermined position after photography.

53. A device according to claim 37, and further comprising control means for controlling the drive means so as to return said holding means to a predetermined position after photography.

54. A device according to claim 37, wherein said guide means includes means for causing said optical means to perform magnification variation and focal adjustment while said guide means guides the movement of said holding means between a first position and a second position.

55. A device according to claim 37, wherein said guide means includes means for guiding the movement of said optical means to a zone for varying the magnification of said optical means and to a zone for performing the focal adjustment of said optical means.

56. A device according to claim 37, wherein said guide means includes means for guiding the movement of said holding means to a first zone for focal adjustment under a first magnification of said optical means, a second zone for varying said first magnification to a second magnification, and to a third zone for focal adjustment of said optical means under the second magnification.

57. A device according to claim 37, wherein said drive means includes means for operation in response to a release operation.

58. A camera having a drive device for an optical system, comprising:
(A) magnification varying signal output means for outputting a magnification varying signal;
(B) focal adjusting signal output means for outputting a focal adjusting signal;
(C) optical means;
(D) holding means for holding said optical means and having a threaded portion;
(E) guide means for guiding said holding means;
(F) moving means having a threaded portion engageable with the threaded portion of said holding means, for moving said holding means in accordance with guidance of said guide means by rotation of the threaded portion thereof; and
(G) driving means for driving said moving means in response to the outputs of the magnification varying signal output means and said focal adjusting signal output means.

59. A camera according to claim 58, wherein the threaded portion of said holding means includes a threaded hole.

60. A camera according to claim 59, wherein the threaded portion of said moving means includes a threaded bar.

61. A camera according to claim 58, wherein the threaded portion of said moving means includes a threaded bar.

62. A camera according to claim 58, wherein said guide means includes means for sliding said holding means.

63. A camera according to claim 58, wherein said guide means includes a guide bar.

64. A camera according to claim 58, wherein said drive means includes a motor.

65. A camera according to claim 58, wherein said drive means includes electrical drive means.

66. A camera according to claim 58, and further comprising judging means for judging the movement state of said holding means moving in accordance with the guide of said guide means.

67. A camera according to claim 66, wherein said judging means includes pulse generating means for generating a signal for movement of said holding means.

68. A camera according to claim 66, wherein said judging means includes pulse generating means for judging an operation amount of said moving means.

69. A camera according to claim 58, and further comprising judging means for judging whether said optical means has moved to a position corresponding to the outputs of said magnification varying signal output means and said focal adjustment signal output means.

70. A camera according to claim 69, wherein said judging means includes means for stopping said drive means with judgement that said optical means has moved to the position corresponding to the outputs of said magnification varying signal output means and said focal adjustment signal output means.

71. A camera according to claim 69, wherein said judging means includes means for stopping said holding means with judgement that said optical means has moved to the position corresponding to the outputs of said magnification varying signal output means and said focal adjustment signal output means.

72. A camera according to claim 66, and further comprising means for causing said optical means to automatically return to a predetermined position after photography in response to the judging means.

73. A camera according to claim 58, and further comprising means for causing said optical means to automatically return to a predetermined position after photography.

74. A camera according to claim 58, and further comprising control means for controlling said drive means so as to return said optical means to a predetermined position after photography.

75. A camera according to claim 58, wherein said guide means includes means for causing said optical means to perform magnification variation and focal adjustment while said guide means guides the movement of said holding means between a first position and a second position.

76. A camera according to claim 58, wherein said guide means includes means for guiding the movement of said optical means to a zone for varying the magninication of said optical means and to a zone for performing the focal adjustment of said optical means.

77. A camera according to claim 58, wherein said guide means includes means for guiding the movement of said holding means to a first zone for focal adjustment under a first magnification of said optical means, a second zone for varying said first magnification to a second magnification, and to a third zone for focal adjustment of said optical means under the second magnification.

78. A camera according to claim 58, wherein said drive means includes means for operation in response to a release operation.

79. A camera according to claim 58, wherein said optical means includes photographic optical means.

* * * * *